US007523957B2

(12) United States Patent
Palm

(10) Patent No.: US 7,523,957 B2
(45) Date of Patent: Apr. 28, 2009

(54) HEADREST AIRBAG

(75) Inventor: James E. Palm, Tecumseh, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 201 days.

(21) Appl. No.: 11/534,377

(22) Filed: Sep. 22, 2006

(65) Prior Publication Data
US 2008/0073886 A1    Mar. 27, 2008

(51) Int. Cl.
B60R 21/16 (2006.01)
(52) U.S. Cl. .................. 280/730.1; 280/730.2; 297/391
(58) Field of Classification Search ............. 280/730.1, 280/730.2; 297/391
See application file for complete search history.

(56) References Cited

U.S. PATENT DOCUMENTS

| 4,865,388 | A |   | 9/1989  | Nemoto |           |
|-----------|---|---|---------|--------|-----------|
| 5,466,001 | A |   | 11/1995 | Gotomyo et al. | |
| 5,472,230 | A |   | 12/1995 | Every, Sr. et al. | |
| 5,833,312 | A |   | 11/1998 | Lenz | |
| 6,095,550 | A | * | 8/2000  | O'Loughlin et al. | 280/730.1 |
| 6,149,231 | A | * | 11/2000 | Wustholz | 297/216.12 |
| 6,158,812 | A | * | 12/2000 | Bonke | 297/391 |
| 6,196,576 | B1 | * | 3/2001 | Sutherland et al. | 280/730.1 |
| 6,196,579 | B1 | * | 3/2001 | Bowers et al. | 280/735 |
| 6,568,754 | B1 | * | 5/2003 | Norton et al. | 297/216.12 |
| 6,572,137 | B2 |   | 6/2003 | Bossecker et al. | |
| 6,805,404 | B1 | * | 10/2004 | Breed | 297/216.12 |
| 7,150,468 | B2 | * | 12/2006 | Pan | 280/730.1 |
| 7,318,601 | B2 | * | 1/2008 | Sugimoto et al. | 280/730.1 |

FOREIGN PATENT DOCUMENTS

| DE | 19509014 | 9/1996 |
|----|----------|--------|
| JP | 10006907 | 1/1998 |

* cited by examiner

Primary Examiner—Toan C To
(74) Attorney, Agent, or Firm—Gifford, Krass, Sprinkle, Anderson & Citkowski, P.C.

(57) ABSTRACT

The present invention affords a headrest airbag for reducing or preventing whiplash and/or head injuries related to vehicle collisions. The headrest airbag is comprised of a trim material that encloses a headrest member, a receiving means for receiving an exchangeable gas bag module and an exchangeable gas bag module at least partially inserted into the receiving means. The exchangeable gas bag module is comprised of an inflatable gas bag and a gas generator for inflating the gas bag. The gas bag maintains its location within the receiving means of the headrest airbag whether it is inflated or not. The inflated gas bag reduces the distance that a head of a driver or passenger is thrown in a rearward direction before coming into contact with a headrest, and reduces the force of such an impact.

12 Claims, 3 Drawing Sheets

HEADREST AIRBAG

FIELD OF THE INVENTION

The present invention relates to an airbag, in particular to a headrest airbag.

BACKGROUND OF THE INVENTION

Automotive safety is generally concerned with reducing the number of traffic accidents and lessening the severity of injuries when such accidents occur. During a collision of an automobile from the rear, or when a human body is thrown back after a violent braking or after a front-end collision, the lower back of the body and the trunk of the body are thrown into a backward direction. In contrast, the head, which is relatively heavy in relation to the remaining parts of the body, follows the trunk of the body under a violent bow at the neck and the back of the head. This can cause serious injuries, for example whiplash, which are sometimes not immediately observed but manifest themselves some time after the accident has happened.

Most protection apparatus of vehicles have been developed to protect the driver or the passengers from injuries obtained when the body is thrown forward during a crash. Relatively few efforts have been made to reduce injuries to human beings when a vehicle is collided with from behind, or when the body is thrown in a rearward direction resulting from a violent stop.

Conventional neck and/or back head supports do provide some protection against whiplash injuries, but often are not correctly placed in relation to the head of the driver or the passenger. For example, a head support is generally placed too low in relation to the driver or passenger's head, and depending on the stationary location of a back head support they often do not meet the violent movement which the head is subjected to during a whiplash.

The operation and inflation of a vehicular airbag, sometimes known as a vehicular gas bag, is well known to those skilled in the art. For example, U.S. Pat. No. 5,472,230 discloses the operation of a portable vehicular air bag device and U.S. Pat. No. 6,149,231 discloses a headrest with a gas bag module inserted therein. However, prior art disclosures of vehicular air bags or headrests with air bags inserted within either do not address the need for protecting drivers and/or passengers from whiplash and/or head injuries, or are not feasible with respect to cost and/or labor required to replace said units. Therefore, there is a need to provide an economical and replacement-efficient headrest airbag which counteracts and/or aids in the prevention of whiplash and/or head injuries.

SUMMARY OF THE INVENTION

The present invention affords a headrest airbag for reducing or preventing whiplash and/or head injuries related to vehicle collisions. The headrest airbag is comprised of a trim material that encloses a headrest member, a receiving means for receiving an exchangeable gas bag module and an exchangeable gas bag module at least partially inserted into the receiving means. The exchangeable gas bag module is comprised of an inflatable gas bag and a gas generator for inflating the gas bag. The gas bag maintains its location within the receiving means of the headrest airbag whether it is inflated or not. However, the inflated gas bag reduces the distance that a head of a driver or passenger is thrown in a rearward direction before coming into contact with a headrest, and reduces the force of such an impact. In one embodiment of the present invention, the receiving means is located adjacent to a front surface of a headrest member in order to reduce whiplash type injuries. Another embodiment affords for the receiving means to be located adjacent to a back surface of the headrest in order to reduce head injuries experienced by back seat passengers during a front-end collision. In yet another embodiment, a receiving means is located adjacent to the front surface and the back surface of the headrest member in order to reduce whiplash type injuries by drivers and front seat passengers and head injuries experienced by back seat passengers. In this manner, a headrest airbag reduces the severity of a whiplash and/or head injury for a driver or passenger in an automobile accident.

DETAILED DESCRIPTION OF THE INVENTION

Figure 1:
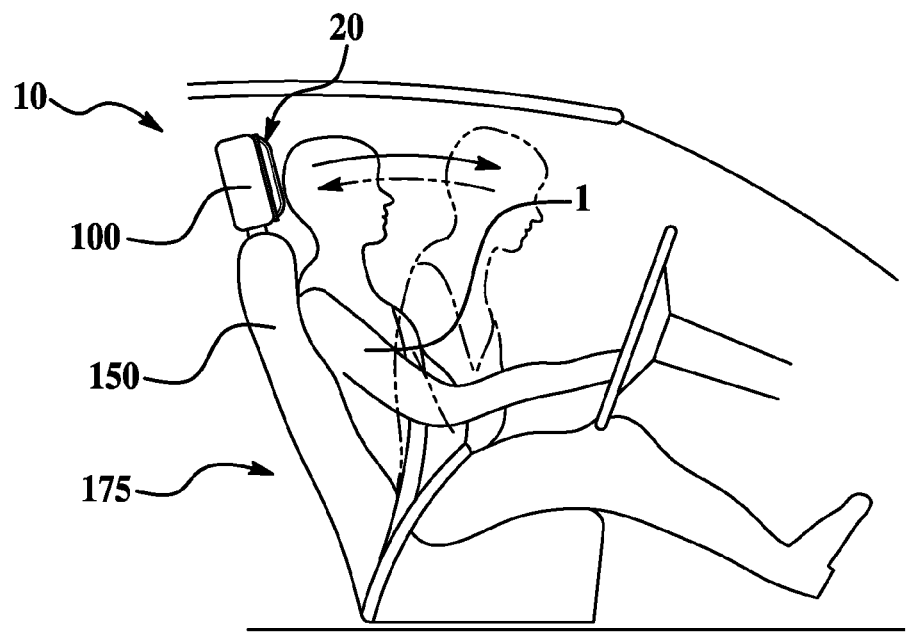
FIG. 1 shows a perspective view of the present invention wherein the airbag is not deployed.

In accordance with the present invention, an embodiment of a headrest airbag is shown generally at 10 in FIG. 1. A headrest 100, with airbag assembly 20 attached thereto, is fixedly attached to a seat back 150. Seat back 150 is part of vehicle seat 175. When a person 1 (driver or passenger) is traveling in a motor vehicle, the headrest 100 with airbag assembly 20 affords a comfortable surface for the head of said person to rest upon. The headrest 100 with airbag assembly 20 can increase the comfort a person experiences during traveling, particularly on long trips.

Figure 2:
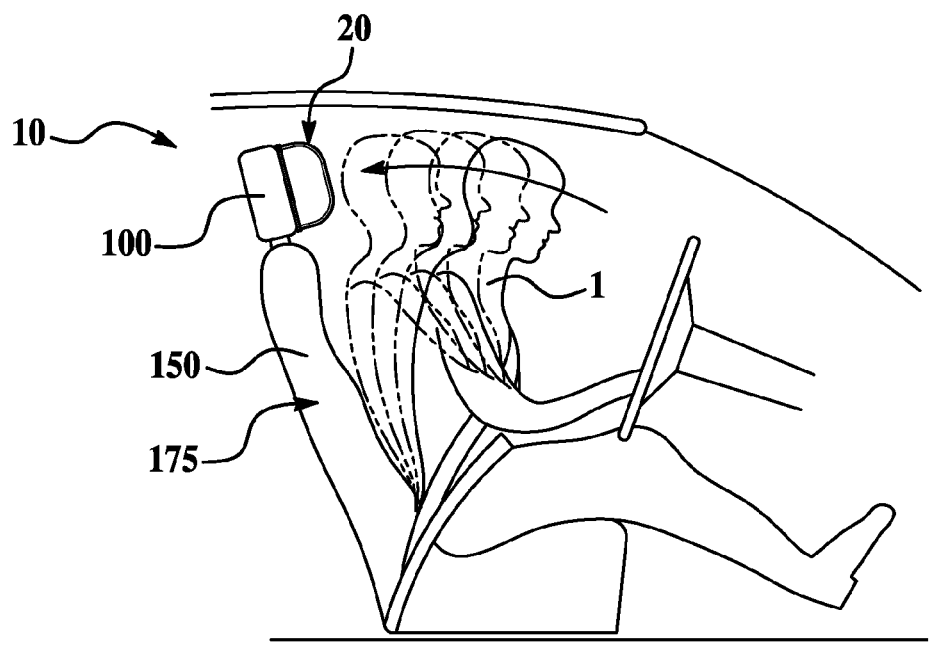
FIG. 2 shows a perspective view of the present invention wherein the airbag is deployed.

In the event a motor vehicle experiences a sudden stop, for example due to a front end collision, or experiences a rear end collision, person 1 is typically thrown forward and backward in a violent manner as illustrated in phantom in FIGS. 1 and 2. The violent contact of the back and head of person 1 against seat back 150 and headrest 100 can result in back, neck and/or head injuries. However the present embodiment affords for the deployment of the airbag assembly 20 during a collision, as illustrated in FIG. 2. The deployment of airbag assembly 20 reduces the distance and impact force the head of person 1 experiences as the result of said collision and thereby reduces the risk and/or severity of an injury.

Figure 3:
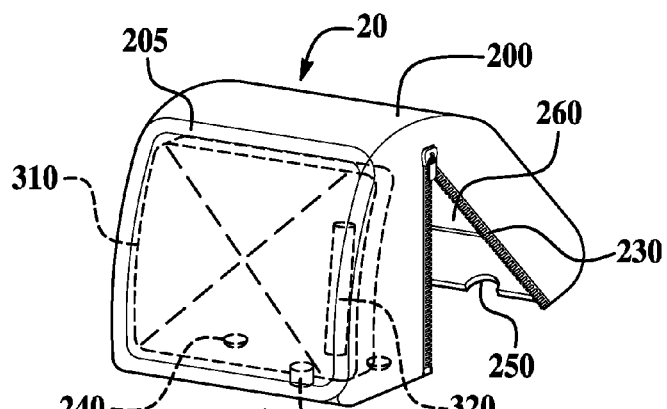
FIG. 3 shows a perspective view of the present invention prior to installation onto a headrest.
Figure 3:
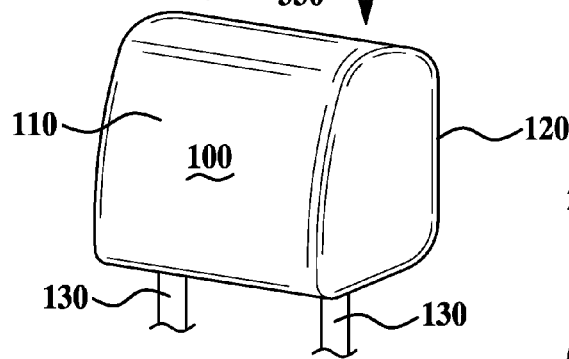
Figure 4:
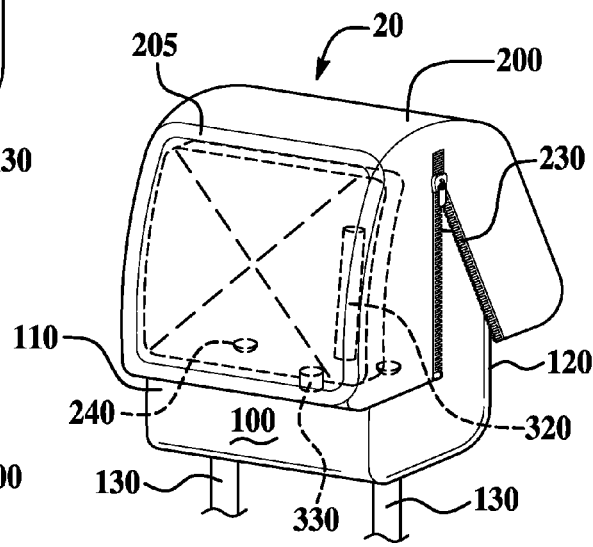
FIG. 4 shows a perspective view of the present invention during installation onto a headrest.
Figure 5:
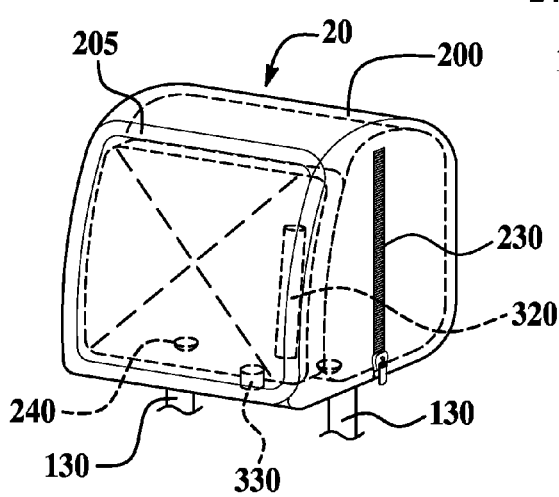
FIG. 5 shows a perspective view of the present invention after installation onto a headrest.

Installation and replacement of the headrest airbag assembly 20 is illustrated in FIGS. 3 through 5. The assembly 20 is comprised of a trim material 200 with an opening 260 that affords for placing the assembly 20 onto the headrest 100, and removal therefrom. The opening 260 is bounded on each side with an enclosure means, illustratively including zippers, buttons, magnets, hook and loop fasteners and combinations thereof. In the present embodiment, zipper 230 and buttons 240 are illustratively shown. For esthetic and/or safety purposes, the enclosure means can be located at different areas of the assembly 20 and/or covered with a flap or some other covering device (not shown). Trim material 200 can also be comprised of at least one slot 250 for the purpose of allowing assembly 20 to fit around headrest posts 130 of head rest 100. In addition, buttons 240 or some other enclosure means can be used to enclose trim material 200 in the area between headrest posts 130.

Within a receiving means 205, an inflatable gas bag or air bag 310 is at least partially inserted, along with a gas generator 320 and a motion/inflation sensor 330. Upon sensing a violent stop and/or a rear end collision, inflation sensor 330 can communicate with gas generator 320 which can subsequently inflate airbag 310.

Figure 6:
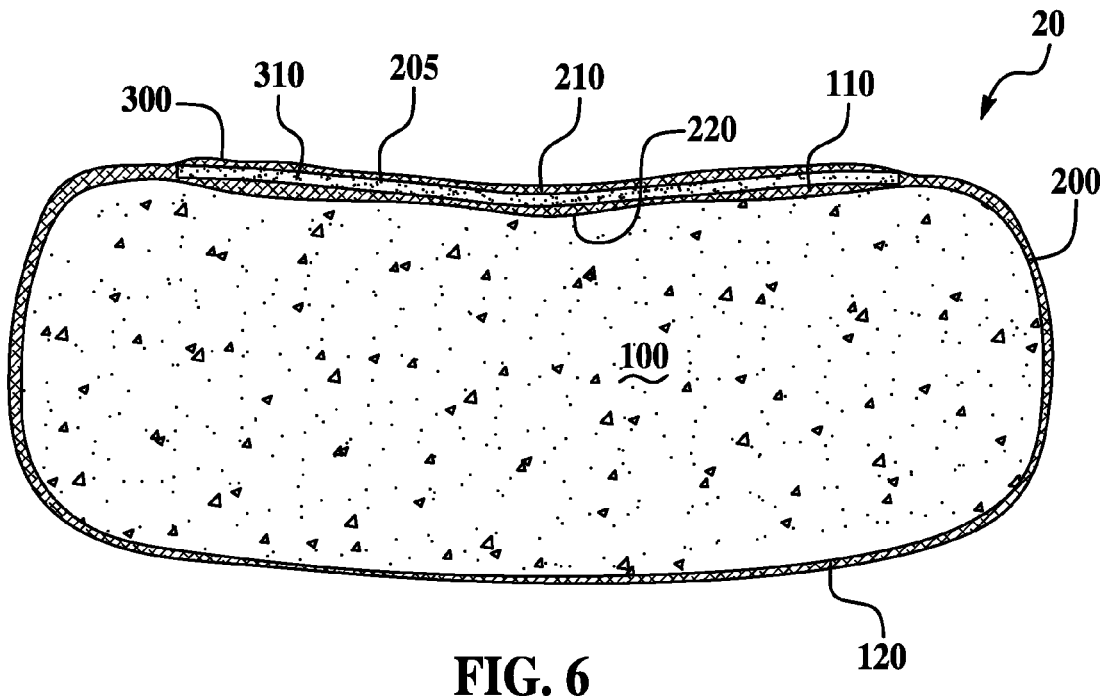
FIG. 6 is a top cross-sectional view of a first embodiment of the present invention wherein the airbag is not deployed.

Turning to FIG. 6, the headrest 100 has a front surface 110 and a back surface 120. In addition, receiving means 205 is comprised of an outer layer 210 and an inner layer 220. Located within receiving means 205 and at least partially inserted between outer layer 210 and inner layer 220 is an exchangeable airbag module 300. The exchangeable airbag module 300 is comprised of the inflatable gas bag 310 and the gas generator 320 (not shown) for inflating said gas bag. The operation and inflation of a vehicular gas bag, also known as an airbag, is well known to those skilled in the art.

Figure 7:
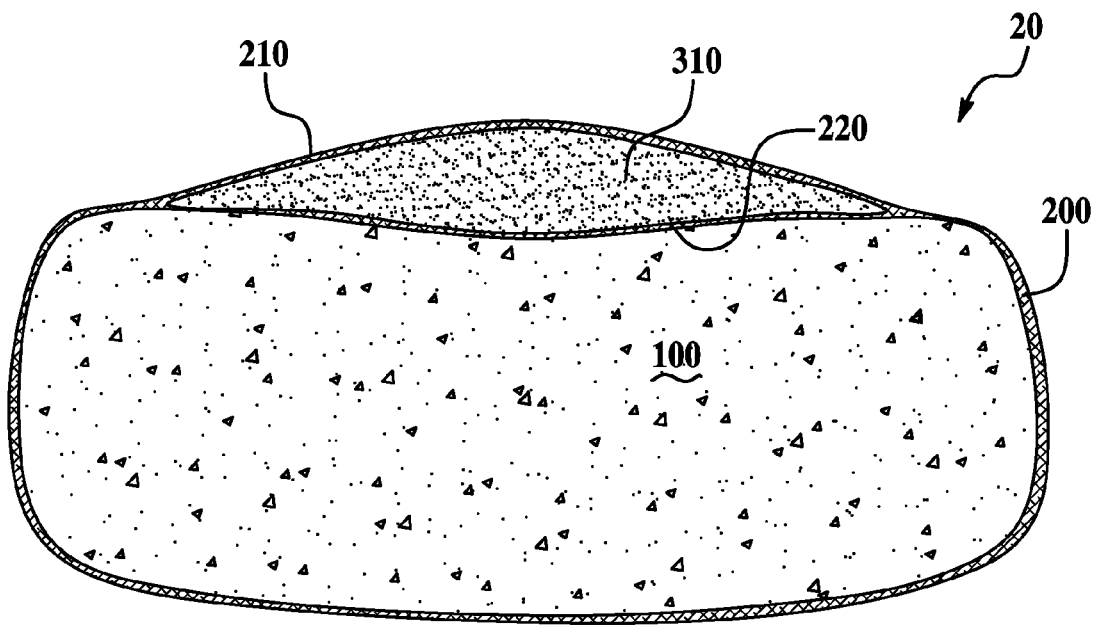
FIG. 7 shows a top cross-sectional view of a first embodiment of the present invention wherein the airbag is deployed.

Upon activation of the airbag module 300, for example when an automobile experiences a front-rear-end collision, the airbag 310 is deployed as shown in FIGS. 2 and 7. After deployment, airbag 310 is still held within the receiving means 205 of the trim material 200. However, deployment of the airbag 310 reduces the distance a head is thrown in a rearward direction and softens the impact when the head contacts the headrest 100, and yet does not damage the vehicle upholstery material (e.g. ripping of upholstery seams). In this manner, a headrest airbag 10 reduces the severity of a whiplash and/or head injury and be replaced in a cost effective manner.

As shown in FIG. 6 and FIG. 7, a first embodiment of the present invention positions the receiving means 205 adjacent to the front surface 110 of the headrest member 100. It is appreciated that the receiving means 205 in this first embodiment is positioned forwardly of the front surface 110, the term forwardly used in relation to the forward end of the motor vehicle as shown in FIGS. 1 and 2. In the alternative, a second embodiment of the present invention (not shown) positions the receiving means 205 of the trim material 200 adjacent to the back surface 120 of the headrest member 100. It is further appreciated that the receiving means for this second embodiment is positioned rearwardly of the back surface 120. In this manner, deployment of the headrest airbag 10 reduces the severity of an impact by a passenger in a rear vehicular seat with the headrest located on a front vehicular seat.

In a third embodiment of the present invention (not shown), a receiving means 205 of trim material 200 is positioned forwardly of and adjacent to the front surface 110 and rearwardly of and adjacent to the back surface 120 of headrest 100. Thus when the vehicle experiences a collision, an airbag 310 is deployed in a forward direction from front surface 110 and a rearward direction from back surface 120. In this manner, a headrest airbag reduces the severity of the impact between the head of an individual, seated in a front and/or back vehicular seat and the headrest member 100.

The invention is not restricted to the illustrative examples or embodiments described above. The embodiments are not intended as limitations on the scope of the invention. Methods, apparatus, compositions and the like described herein are exemplary and not intended as limitations on the scope of the invention. Changes therein and other uses will occur to those skilled in the art. The scope of the invention is defined by the scope of the claims.

The invention claimed is:

1. A headrest airbag module that encloses a headrest member, said headrest airbag module comprising:
    a trim material having a receiver for receiving an exchangeable gas bag module and an opening for placing the headrest airbag module on the headrest member and removing it therefrom, said trim material enclosing the headrest member and said receiving means positioned forwardly of and adjacent to a front surface of the headrest member;
    an exchangeable gas bag module at least partially inserted into said receiver of said trim material, said gas bag module having an inflatable gas bag and a gas generator for inflating said gas bag.

2. The headrest airbag of claim 1, further comprising an enclosure means bounding each side of said opening.

3. The headrest airbag of claim 2, wherein said enclosure means on each side of said opening is selected from the group consisting of zippers, buttons, magnets, hook and loop fasteners, and combinations thereof.

4. The headrest airbag of claim 2, further comprising said opening having at least one slot, said at least one slot operable to allow said trim material to fit around a headrest post of the headrest member.

5. The headrest airbag of claim 4, wherein said at least one slot is two slots, said two slots operable to allow for said trim material to fit around two headrest posts of the headrest member.

6. The headrest airbag of claim 5, wherein said enclosure means has at least two buttons operable for said trim material to enclose the headrest member between said two headrest posts.

7. A headrest airbag for attachment to a headrest member, said headrest airbag comprising:
    a trim material having a receiver for receiving an exchangeable gas bag module and an opening for placing the headrest airbag module on the headrest member and removing it therefrom, said trim material enclosing the headrest member and said receiver positioned rearwardly of and adjacent to a back surface of the headrest member;
    an exchangeable gas bag module at least partially inserted into said receiver of said trim material, said gas bag module having an inflatable gas bag and a gas generator for inflating said gas bag.

8. The headrest airbag of claim 7, further comprising an enclosure means bounding each side of said opening.

9. The headrest airbag of claim 8, wherein said enclosure means on each side of said opening is selected from the group consisting of zippers, buttons, magnets, hook and loop fasteners, and combinations thereof.

10. The headrest airbag of claim 8, further comprising said opening having at least one slot, said at least one slot operable to allow said trim material to fit around a headrest post of the headrest member.

11. The headrest airbag of claim 10, wherein said at least one slot is two slots, said two slots operable to allow for said trim material to fit around two headrest posts of the headrest member.

12. The headrest airbag of claim 11, wherein said enclosure means has at least two buttons operable for said trim material to enclose the headrest member between said two headrest posts.

* * * * *